(12) United States Patent
Ogata et al.

(10) Patent No.: US 6,753,910 B1
(45) Date of Patent: Jun. 22, 2004

(54) IMAGE PROCESSING APPARATUS AND IMAGE PROCESSING METHOD

(75) Inventors: Masami Ogata, Kanagawa (JP); Takashi Tsuchiya, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/441,824

(22) Filed: Nov. 17, 1999

(30) Foreign Application Priority Data

Nov. 18, 1998 (JP) .......................................... 10-328274

(51) Int. Cl.$^7$ ................................................ H04N 9/68
(52) U.S. Cl. ...................... 348/235; 358/461; 358/521
(58) Field of Search ................................ 358/448, 521, 358/450, 453, 461

(56) References Cited

U.S. PATENT DOCUMENTS 5,517,333 A * 5/1996 Tamura et al. .............. 358/518
6,130,966 A * 10/2000 Sekine et al. ............... 382/299
6,175,660 B1 * 1/2001 Nabeshima et al. ......... 382/274
2002/0034336 A1 * 3/2002 Shiota et al. ................ 382/274

* cited by examiner

Primary Examiner—Andrew Christensen
Assistant Examiner—Dorothy Wu
(74) Attorney, Agent, or Firm—Frommer Lawrence & Haug LLP; William S. Frommer; Bruno Polito

(57) ABSTRACT

The invention provides an image processing apparatus and an image processing method and can be applied to an image information apparatus such as, for example, a television receiver, a video tape recorder, a television camera and a printer so that the gradation can be corrected while effectively preventing a finally obtained image from partial deterioration of the contrast. An area to which each of image data belongs is discriminated with reference to, for example, a low frequency component of a pixel value, and a correction coefficient is produced for the area. Such correction coefficients are smoothed between successive frames, and the pixel values of the image data are corrected with the smoothed correction coefficients.

36 Claims, 15 Drawing Sheets

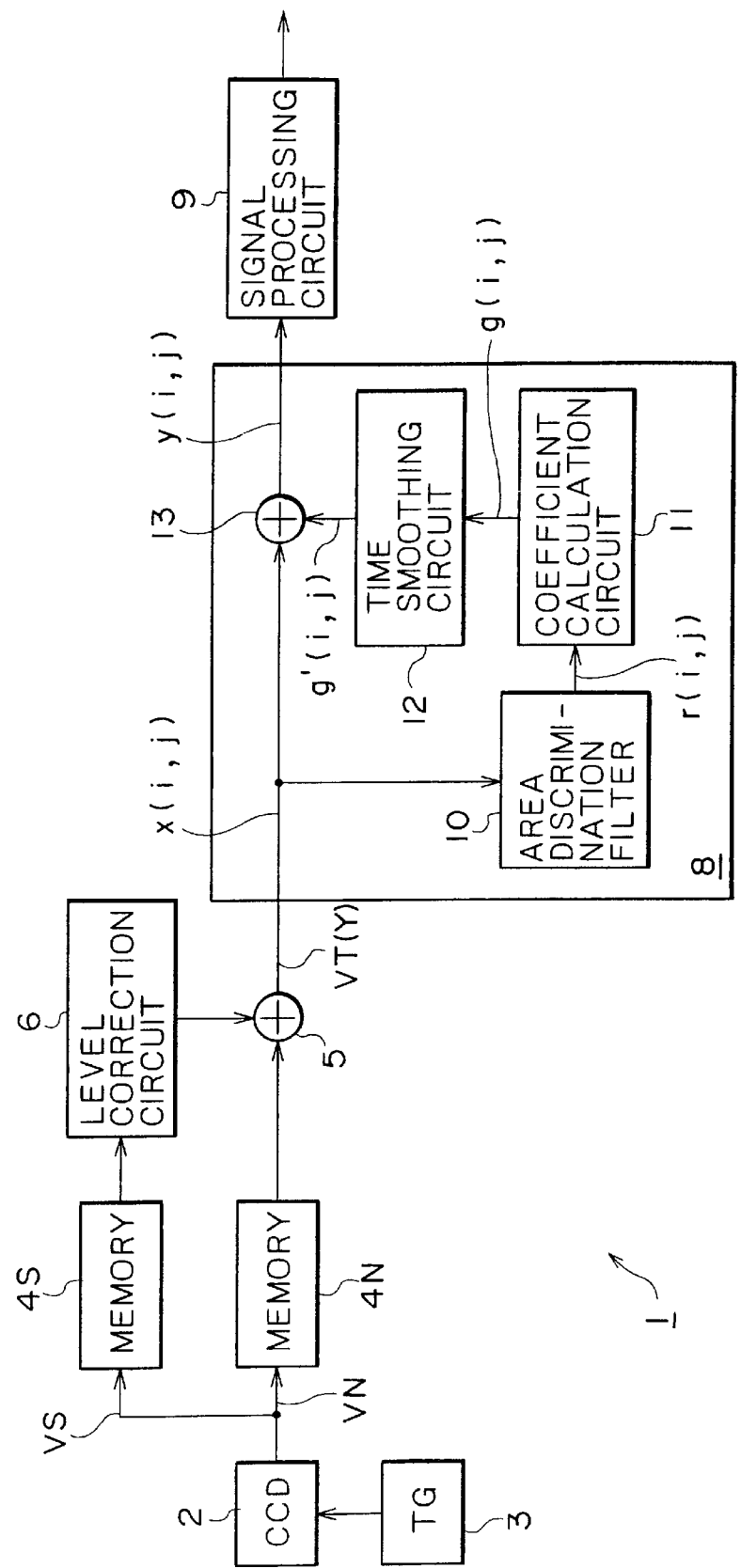

| Ye | Cy | Ye | Cy |
|----|----|----|----|
| Mg | G  | Mg | G  |
| Ye | Cy | Ye | Cy |
| G  | Mg | G  | Mg |

IMAGE PROCESSING APPARATUS AND IMAGE PROCESSING METHOD

BACKGROUND OF THE INVENTION

This invention relates to an image processing apparatus and an image processing method and can be applied to an image processing apparatus such as, for example, a television receiver, a video tape recorder, a television camera and a printer.

Conventionally, an image processing apparatus such as a television camera corrects the gradation of image data obtained from an image inputting apparatus such as an image pickup apparatus and outputs the image data of the corrected gradation.

FIG. 19 is a characteristic diagram showing an input/output characteristic of a signal processing circuit adapted to such gradation correction processing. A signal processing circuit of the type described decreases the gain when the input level L increases higher than a predetermined reference level Lk. Consequently, a signal processing-circuit of the type described suppresses the signal level and outputs the signal of the suppressed signal level when the input level is higher than the reference level Lk. In this instance, the gradation is corrected sacrificing the contrast at a portion of an image having a comparatively high signal level.

In the characteristic diagram of FIG. 19, the axis of abscissa represents the pixel value L which is the input level of image data while the axis of ordinate represents the pixel value T(L) which is the output level of the image data, and Lmax represents the maximum level which can be taken by any pixel of the input/output images. In the following description, a function indicative of an input/output relationship as represented by the characteristic diagram of FIG. 19 is referred to as level conversion function.

FIG. 20 is a characteristic diagram showing an input/output characteristic of, another signal processing circuit of a similar type. The signal processing circuit which uses the level conversion function illustrated in FIG. 20 decreases the gain when the input level L is lower than a first reference level Ls and when the input level L is higher than a second reference level Lb. Consequently, the signal processing circuit corrects the gradation sacrificing the contrast where the signal level is comparatively low and where the signal level is comparatively high with respect to an intermediate range of the input signal level.

On the other hand, in image processing and so forth wherein a computer is used, the gradation is corrected, for example, by histogram equalization.

The histogram equalization is a method of adaptively varying the level conversion function in response to the frequency distribution of a pixel value of an input image, and corrects the gradation by reducing the gradation at a portion where the frequency distribution of the pixel value is low.

Referring to FIG. 21, in processing of the histogram equalization, a cumulative frequency distribution C(L) by arithmetic processing of the following expression (1) is detected based on a frequency distribution H(L) which is an aggregate of the number of pixels with reference to the pixel value L of the input image:

$$C(L) = \sum_{k=0}^{L} H(k) \quad (1)$$

In the processing of the histogram equalization, the cumulative frequency distribution C(L) detected in this manner is normalized by processing with the following expression (2) to define a level conversion function T(L), and the signal level of the input image is corrected in accordance with the level conversion function T(L).

$$T(L) = \frac{C(L)}{F\max} \times L\max \quad (2)$$

where Fmax is the final value of the cumulative frequency distribution C(L), and Lmax is the maximum value of the input/output levels.

Such processing of correcting the gradation as described above is executed suitably in accordance with the necessity, for example, in order to suppress the dynamic range or for some other object when image data are transmitted over a transmission line, when image data are displayed on a display unit, when image data are stored into a storage device or in a like case.

In the correction processes of the gradation according to the conventional techniques described above, the entire gradation is corrected sacrificing the contrast at some portion of the input image. This is because, with any of the techniques, the level is converted with an input/output function having a monotone increasing property in order to prevent production of an unnatural image.

Accordingly, the conventional techniques have a problem in that an image obtained by processing finally has a partially reduced contrast.

SUMMARY OF THE INVENTION

It is an object of the present invention to provide an image processing apparatus and an image processing method by which the gradation can be corrected while effectively preventing a finally obtained image from partial deterioration of the contrast.

In order to attain the object described above, according to the present invention, an area to which image data belong is discriminated, for example, with reference to a low frequency component of a pixel value to produce a correction coefficient, and such correction coefficients are smoothed between frames to correct the pixel values of the image data so that the gradation also of a moving picture can be corrected while preventing partial deterioration in contrast effectively.

More particularly, in an image processing apparatus and an image processing method according to an aspect of the present invention, an area to which image data belong is discriminated, and a correction coefficient to be used for correction of a pixel value of the image data is produced based on a result of the discrimination, and then such correction coefficients are smoothed between corresponding image data of successive frame and the pixel values of the image data are corrected with the smoothed correction coefficient.

Where an area to which image data belong is discriminated and a correction coefficient to be used for correction of a pixel value of the image data is produced based on a result of the discrimination and then the pixel value of the image data is corrected with the correction coefficient, the pixel values in the same area can be corrected with the same coefficient to maintain the relationship in magnitude among the pixel values in the area, but the relationship in magnitude between pixel values which belong to different areas can be varied, for example, reversed. Consequently, the gradation of the entire image can be corrected while preventing partial deterioration of the contrast. In this instance, where such correction coefficients which correspond to each other are smoothed between corresponding image data of successive frames, the gradation of an entire image can be corrected without giving any unnatural feeling even if the image involves some motion.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a television camera according to a first preferred embodiment of the present invention;

DESCRIPTION OF THE PREFERRED EMBODIMENTS

1. First Embodiment 1-1. Construction of the First Embodiment

Referring to FIG. 1, there is shown a television camera according to a first preferred embodiment of the present invention. The television camera is generally denoted at 1 and includes a CCD solid-state image pickup device 2. The CCD solid-state image pickup device 2 is driven by a timing generator (TG) 3 and outputs a result of image pickup. More particularly, the CCD solid-state image pickup device 2 obtains an image pickup result in a period of 1/60 second based on a charge accumulation time set by a user and outputs the image pickup result as an image pickup result VN by normal exposure. Further, the CCD solid-state image pickup device 2 obtains, within a vertical blanking period of the image pickup result VN by normal exposure, an image pickup result by another charge accumulation time which is shorter than the charge accumulation time by normal exposure, and outputs the image pickup result as an image pickup result VS by short time exposure.

Figure 2A:
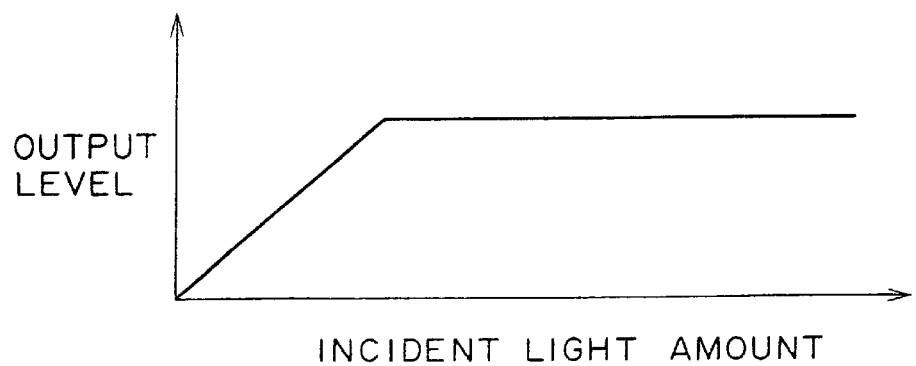
FIGS. 2A to 2C are characteristic diagrams illustrating processing of an image pickup result by the television camera of FIG. 1.
Figure 2B:
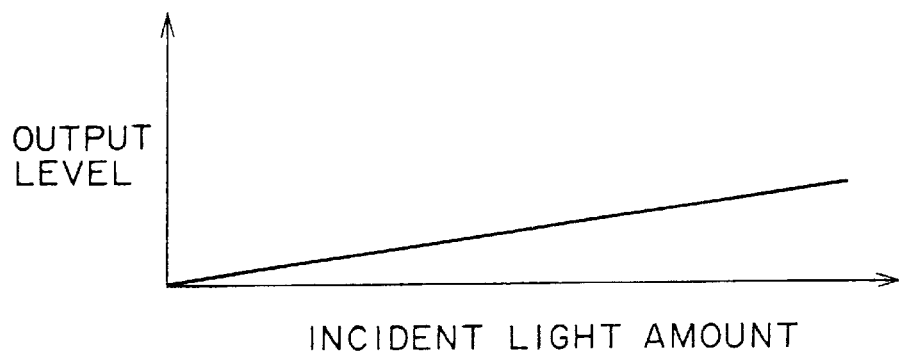

Consequently, when the incoming light amount to the CCD solid-state image pickup device 2 is higher than a predetermined level, the image pickup result VN by normal exposure which indicates that the output level is saturated as seen in FIG. 2A and the image pickup result VS by short time exposure which indicates that the output level is not saturated as seen in FIG. 2B because the charge accumulation time is shorter than that by normal exposure are output in a set from the CCD solid-state image pickup device 2.

Referring back to FIG. 1, the television camera 1 further includes a memory 4N which receives, through a correlation double sampling circuit, a defect correction circuit, a matrix arithmetic circuit, an analog to digital conversion circuit and other necessary circuits all not shown, the image pickup result VN by normal exposure in the form of color signals of red, blue and green obtained by the processing of the circuits mentioned, and temporarily holds and stores the image pickup result VN by normal exposure.

The television camera 1 further includes a memory 4S which similarly receives, through the correlation double sampling circuit, defect correction circuit, matrix arithmetic circuit, analog to digital conversion circuit and so forth all not shown, the image pickup result VS by shorter time exposure, and temporarily holds and stores the image pickup result VS by shorter time exposure.

An addition circuit 5 adds the image pickup result VN by normal exposure stored in the memory 4N and the image pickup result VS by shorter time exposure stored in the memory 4S to obtain an image pickup result VT which has a broad dynamic range and has a sufficient pixel value, and outputs the image pickup result VT. A level correction circuit 6 corrects a pixel value of the image pickup result VS by shorter time exposure outputted from the memory 4S so that the image pickup result VT from the addition circuit 5 may have a linearity sufficient for practical use, and outputs the corrected pixel value.

Figure 2C:
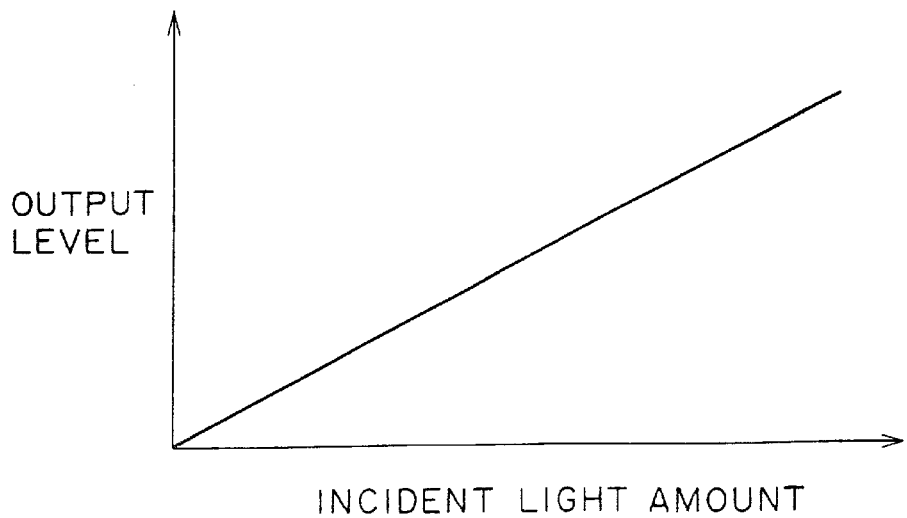

Consequently, the television camera 1 produces an image pickup result VT having a dynamic range significantly greater than that obtained by a conventional television camera as seen in FIG. 2C.

A gradation correction circuit 8 corrects the pixel value of the image pickup result VT to correct the gradation of the image pickup result VT and outputs the image pickup result VT of the corrected gradation. A signal processing circuit 9 following the gradation correction circuit 8 executes various signal processes necessary for the television camera to obtain an image pickup result and outputs the image pickup result to an external apparatus. Thereupon, the image pickup result is suppressed uniformly to suppress the dynamic range of the image pickup result so as to conform with the external apparatus, and the resulting image pickup result is outputted to the external apparatus.

In the processing, the gradation correction circuit 8 executes arithmetic processing of the following expression (3) in advance to produce a luminance signal Y from the image pickup result VT including color signals R, G and B, corrects the gradations of the color signals R, G and B with reference to the luminance signal Y, and outputs resulting color signals R, G and B.

$$Y 0.3R + 0.59G + 0.11B \qquad \ldots (3)$$

The gradation correction-circuit 8 includes an area discrimination filter 10 which discriminates an area to which the luminance signal Y of the image pickup result VT belongs and outputs a result of the discrimination. Thereupon, the area discrimination filter 10 detects an average luminance level which is an average value of pixel values as a characteristic amount which indicates a characteristic of a predetermined range neighboring to each image data, discriminates to which average luminance level area the image data belong, and outputs the average luminance level as a discrimination result.

Figure 3:
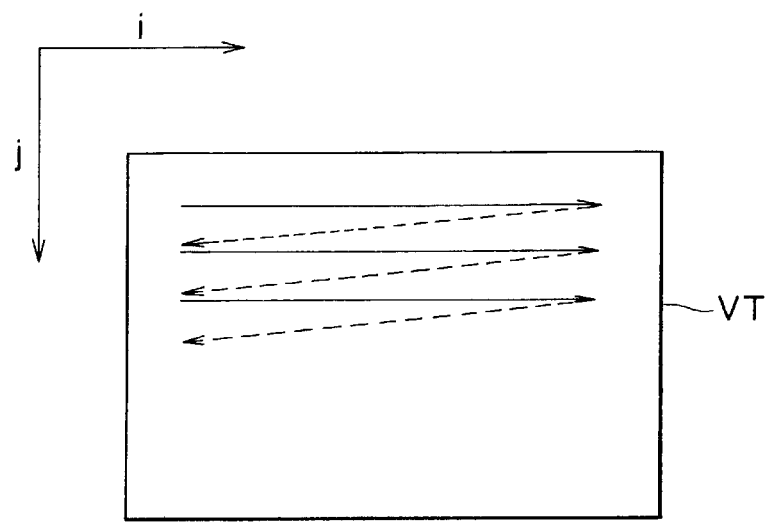
FIG. 3 is a schematic view illustrating an arrangement of pixel values by the television camera of FIG. 1.

In particular, the area discrimination filter 10 is a two-dimensional low-pass filter and detects, from each of pixel values x(i, j) of the luminance signal Y of the image pickup result VT successively inputted thereto in the order of raster scanning, a low frequency component r(i, j) represented by the following expression (4), and outputs the low frequency component r(i, j) as a discrimination result.

$$r(i, j) = \sum_{dj=-N/2}^{N/2} \sum_{di=-M/2}^{M/2} \frac{x(i+di, j+dj)}{M \times N} \qquad (4)$$

where N and M are constants representative of the magnitude of the neighboring area for which an average value is calculated, and as seen from FIG. 3, in the television camera 1 of the present embodiment, in regard to the image pickup result VT inputted in the order of raster scanning, the horizontal direction is indicated by the subscript "i" while the vertical direction is indicated by the subscript j. Consequently, the area discrimination filter 10 removes fine image structures from within an image according to the image pickup result VT thereby to extract an area in which the pixel values are comparatively flat. It is to be noted that, since the area discrimination filter 10 is provided in order to perform such processing as just described, preferably it has a comparatively narrow bandwidth.

Figure 4:
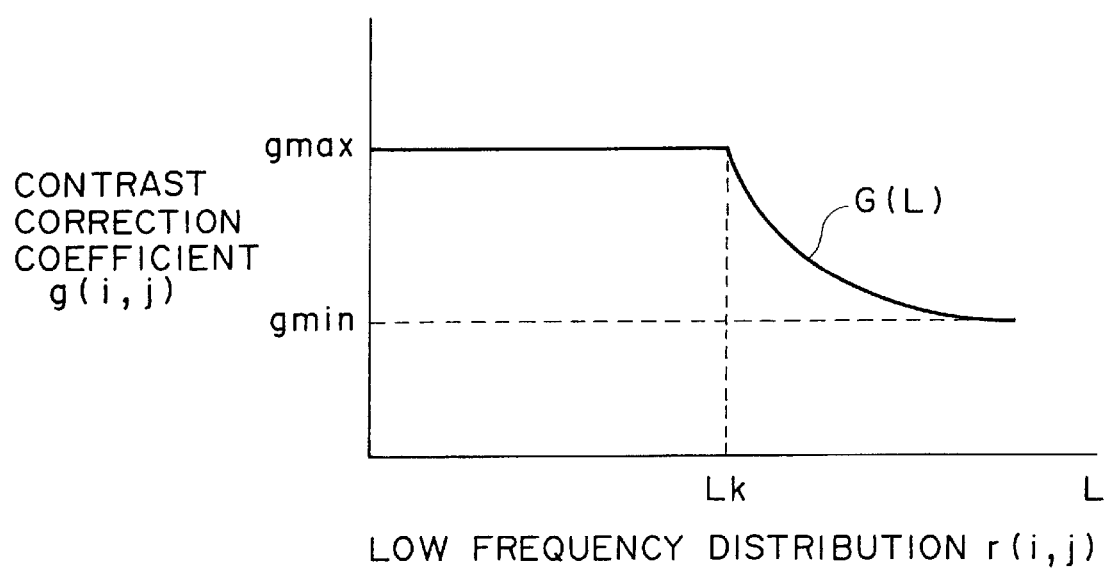
FIG. 4 is a characteristic diagram illustrating a contrast correction coefficient.

Referring back again to FIG. 1, a coefficient calculation circuit 11 of the gradation correction circuit 8 produces a contrast correction coefficient g(i, j) using such a coefficient calculation function G as illustrated in FIG. 4, for example, in response to the signal level of the low frequency component r(i, j). The coefficient calculation function G here is a function obtained by arithmetic processing of, for example, the level conversion function T(L) described hereinabove with reference to FIG. 19 in accordance with the following expression (5):

$$G(L) = \frac{T(L)}{L} \qquad (5)$$

The coefficient calculation circuit 11 thus produces a contrast correction coefficient g(i, j) by arithmetic processing of the following expression (6):

$$g(i, j) = G(r(i, j)) \qquad \ldots (6)$$

Thus, when the signal level of the low frequency component r(i, j) which is an input level is in an area lower than a predetermined reference level Lk, the coefficient calculation circuit 11 outputs a contrast correction coefficient g(i, j) of a fixed value gmax higher than 1, but when the signal level of the r(i, j) is in another area equal to or higher than the reference level Lk, the coefficient calculation circuit 11 output a contrast correction coefficient g(i, j) which gradually increases to a value gmin in response to the signal level of the low frequency component r(i, j).

Figure 5:
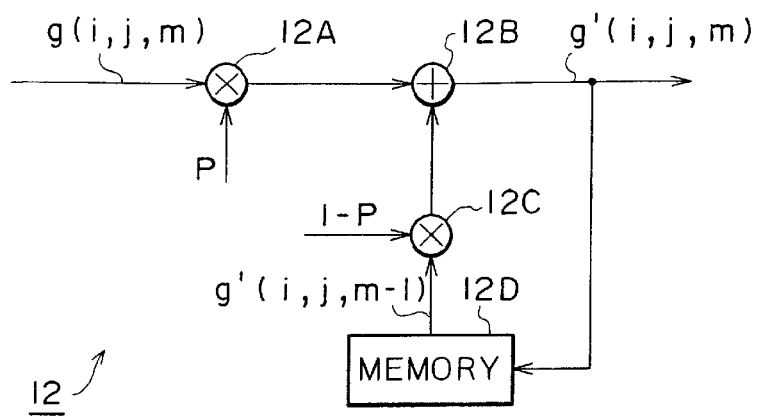
FIG. 5 is a block diagram showing a time smoothing circuit of a gradation correction circuit of the television camera of FIG. 1.

The gradation correction circuit 8 further includes a time smoothing circuit 12 which smoothes corresponding correction coefficients between corresponding pixels of successive frames and outputs the smoothed correction coefficients. Referring to FIG. 5, the time smoothing circuit 12 is an IIR filter which recursively processes input data and includes a multiplication circuit 12A which receives a correction coefficient g(i, j, m) (m represents a frame) inputted thereto from the coefficient calculation circuit 11 shown in FIG. 1 and weights the correction coefficient g(i, j, m) with a weighting value P which forms a time constant.

A succeeding addition circuit 12B of the time smoothing circuit 12 adds an output value of a multiplication circuit 12C to an output value of the multiplication circuit 12A, and a memory 12D successively stores an output value of the addition circuit 12B and outputs the output value of the addition circuit 12B to the multiplication circuit 12C after delaying it by a period of one frame. The multiplication circuit 12C multiplies the output of the memory 12D by a value 1−P obtained by subtracting the weighting value P of the multiplication circuit 12A from the value 1.

Consequently, the time smoothing circuit 12 produces and outputs a correction coefficient g'(i, j, m) represented by the following expression (7) thereby to reduce a variation of a correction coefficient for each pixel in a time base direction.

$$g'(i,j,m) = P \times g(i,j,m) + (1-P) \times g'(i, j, m-1) \qquad \ldots (7)$$

Referring back again to FIG. 1, a multiplication circuit 13 of the gradation correction circuit 8 multiplies the contrast correction coefficient g'(i, j) produced in this manner by the corresponding pixel value x(i, j) of the image pickup result VT (in this instance, such multiplication is processing for each color signal) to correct the signal level of the image pickup result VT with the contrast correction coefficient g'(i, j) and outputs the image pickup result VT of the corrected signal level.

1-2. Operation of the First Embodiment

In the television camera 1 having the construction described above with reference to FIG. 1, the CCD solid-state image pickup device 2 alternately outputs an image pickup result VN (FIG. 2A) by normal exposure according to a charge accumulation time set by a user and another image pickup result VS (FIG. 2B.) by shorter time exposure according to a shorter charge accumulation time. The image pickup results VN and VS are stored into the memories 4N and 4S, respectively. In the television camera 1, the two image pickup results VN and VS are composed by the level correction circuit 6 and the addition circuit 5 so that an image pickup result VT (FIG. 2C) of a dynamic range having significantly greater than that by a conventional television camera is produced.

A luminance signal Y is produced from the image pickup result VT, and a characteristic amount indicative of a characteristic of a predetermined neighboring range to each input image data is detected by the area discrimination filter 10 of the gradation correction circuit 8 thereby to discriminate an area to which the input image data belong and produce a discrimination result indicating this. More particularly, the area discrimination filter 10 detects a low frequency component r(i, j) which is an average value of pixel values as a characteristic amount thereby to remove fine structures in the image and extract an area in which the pixel values are comparatively flat. The low frequency component r(i, j) is outputted as a discrimination result.

From the image pickup result VT, a contrast correction coefficient g(i, j) is produced in response to the signal level of the low frequency component r(i, j) by the coefficient calculation circuit 11, and the pixel value is corrected with the contrast correction coefficient g(i, j) by the multiplication circuit 13 thereby to correct the pixel value with a gain according to each area with reference to the low frequency component r(i, j) by the coefficient calculation circuit 11. The thus corrected pixel value is outputted from the coefficient calculation circuit 11.

Consequently, pixel values in an area of the image pickup result VT in which the signal levels of the low frequency components r(i, j) are equal are corrected with an equal gain, but pixel values in areas in which the signal levels of the low frequency components r(i, j) are different can be made nearer to each other in accordance with a setting of the level conversion function T(L), or depending upon a case, the relationship between pixel values in regard to the magnitude can possibly be reversed. By the processing, the contrast in each area can be increased naturally with respect to the gradation of the entire image, and the gradation of the entire image can be corrected while preventing a partial reduction of the contrast effectively.

Figure 6A:
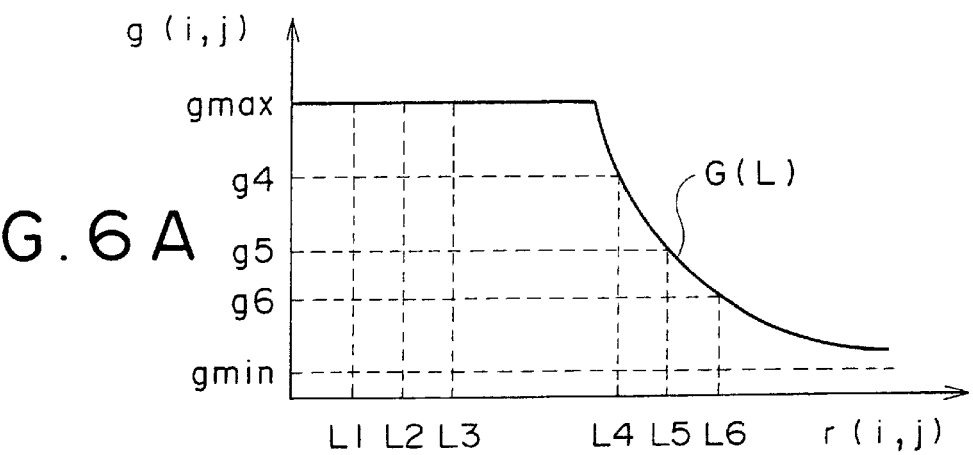
FIGS. 6A to 6D are signal waveform diagrams illustrating processing of the gradation correction circuit of the television camera of FIG. 1.
Figure 6B:
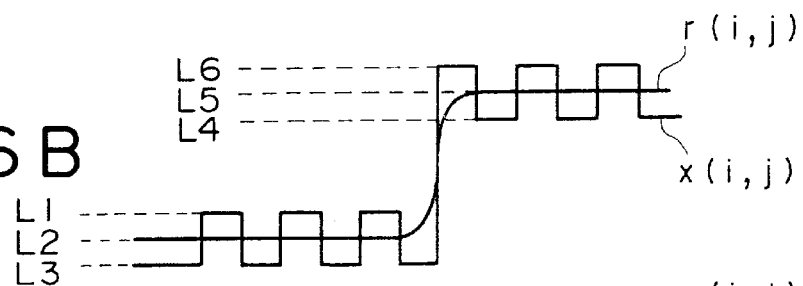
Figure 6C:
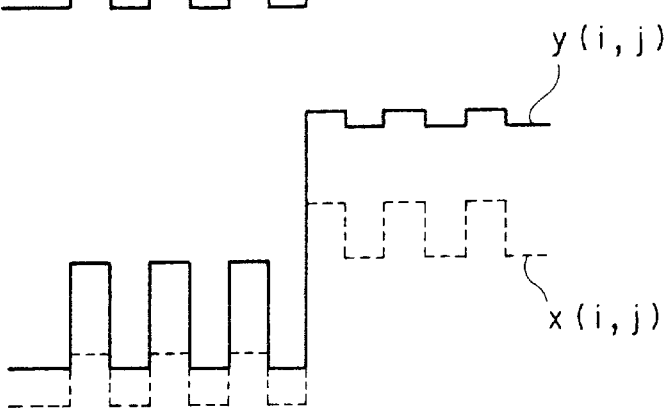
Figure 19:
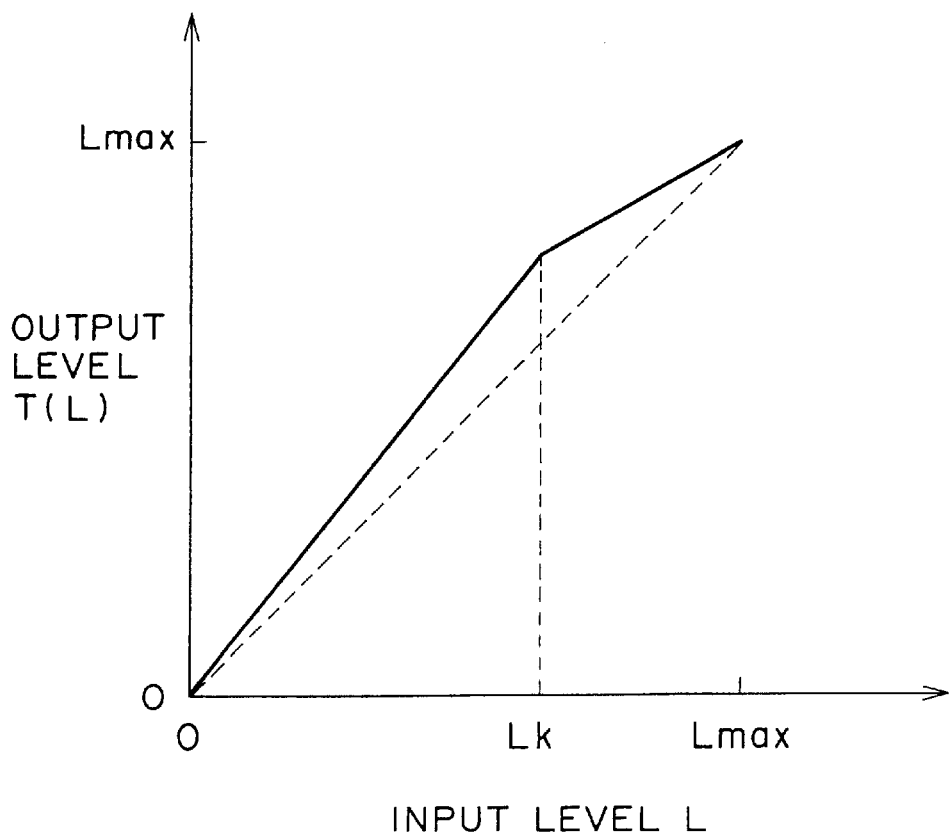
FIG. 19 is a characteristic diagram illustrating a level conversion function applied to conventional suppression processing for a dynamic range.
Figure 20:
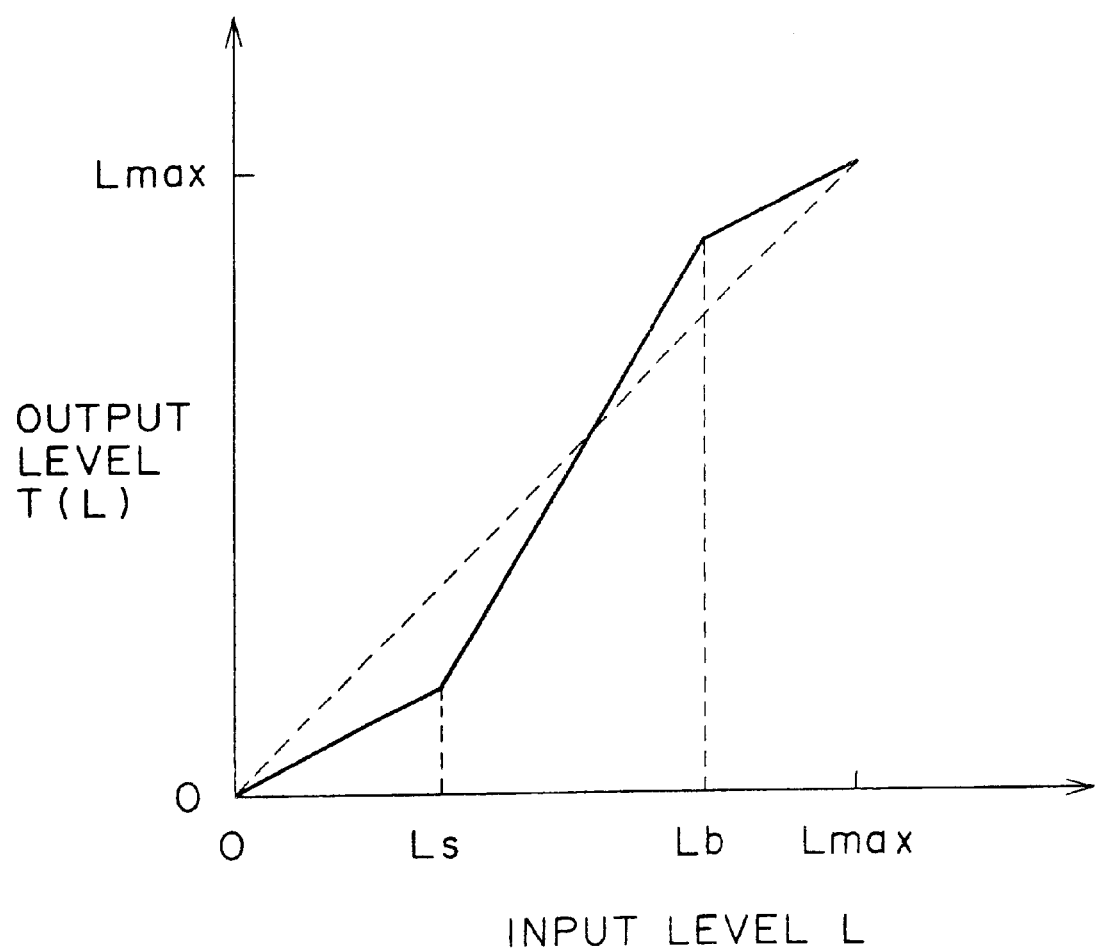
FIG. 20 is a characteristic diagram illustrating another level conversion function applied to different conventional suppression processing for a dynamic range.
Figure 21:
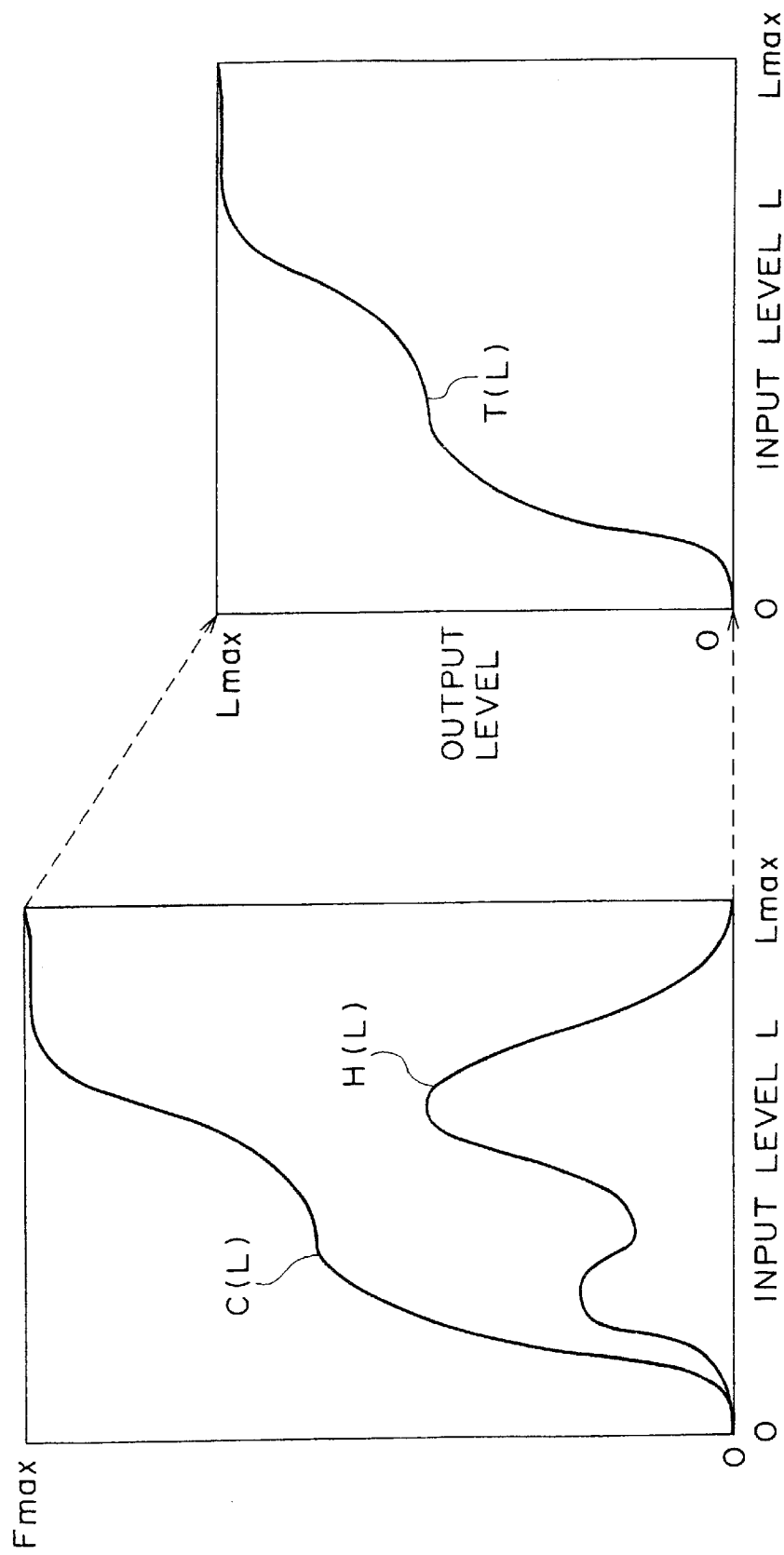
FIG. 21 is a characteristic diagram illustrating processing of histogram equalization.

In particular, when the pixel value x(i, j) of the image pickup result VT is pulsated with a frequency higher than the cutoff frequency of the area discrimination filter 10 in the form of a low-pass filter and the dc level of the pixel value x(i, j) rises suddenly (FIG. 6B) and besides the variation of the low frequency component r(i, j) corresponding to the sudden variation of the dc level crosses an inflection point of a coefficient calculation function G(L) (FIG. 6A), where the conventional level conversion function described hereinabove with reference to FIG. 19 is applied, the contrast is suppressed in a portion where the pixel value x(i, j) is high (FIG. 6C).

Figure 6D:
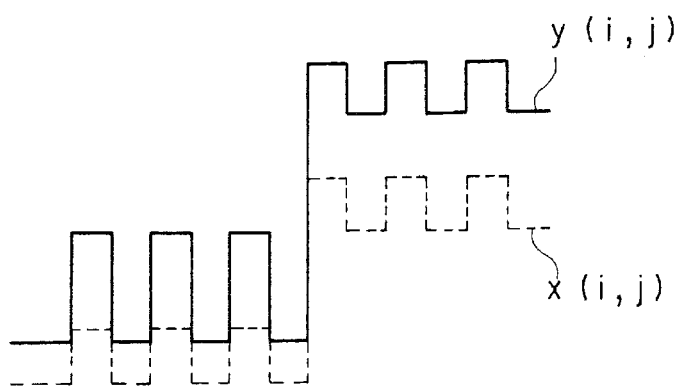

However, with the television camera 1 of the present embodiment, before and after the signal level of the low frequency component r(i, j) rises suddenly, the pixel value x(i, j) is corrected with a gain corresponding to the signal level of the low frequency component r(i, j), and the signal level is corrected in accordance with the setting of the coefficient calculation function G(L). In this instance, where the pixel value x(i, j) is low, it is corrected with the gain gmax based on an average value level L2 between a peak value L3 and a bottom value L1. Consequently, in the low level area, a contrast substantially equal to that obtained by the conventional method can be obtained (FIG. 6D).

In contrast, in a high level side area, the pixel value x(i, j) is corrected with:a gain g5 of an average value level L5 between a peak value L6 and a bottom value L4. In this instance, since the pixel values are corrected with a gain whose peak value L6 and bottom value L4 are uniform, the contrast between the peak value L6 and the bottom value L4 is amplified with the gain g5.

Consequently, the television camera 1 of the present embodiment does not exhibit a great variation in gradation when an image is viewed as a whole, but can expand, when a pulsation is viewed microscopically, a great pulsation by an image pickup result VT of an input image.

Figure 7A:
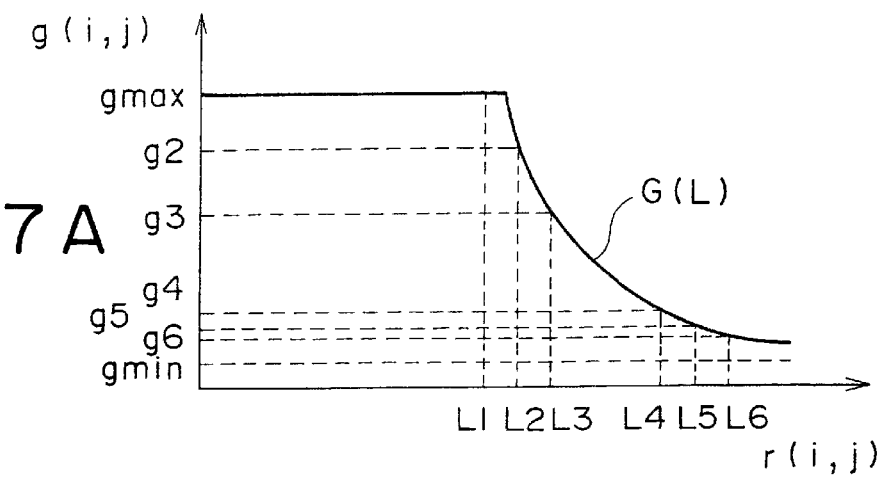
FIGS. 7A to 7D are signal waveform diagrams illustrating processing of the gradation correction circuit when the input level is different from that in the case of FIGS. 6A to 6D.
Figure 7B:
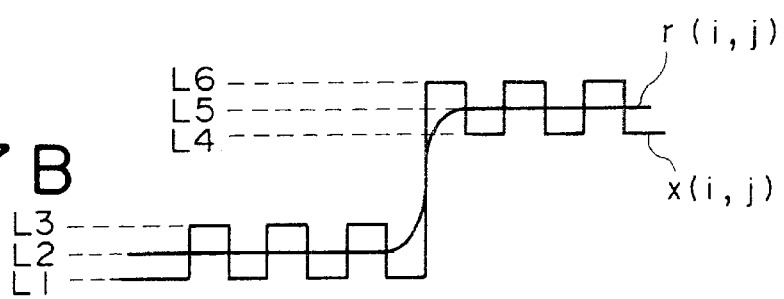
Figure 7C:
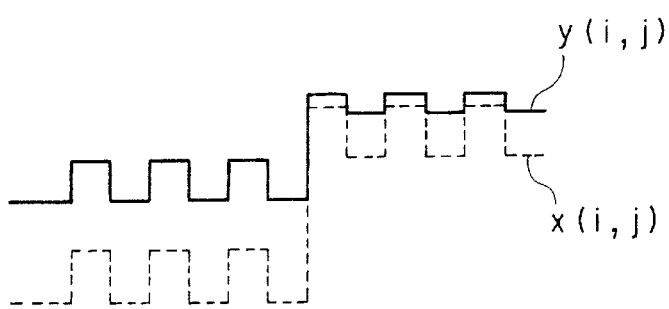

When the pixel value x(i, j) is pulsated similarly and the dc level of it rises suddenly and besides the pulsation of the pixel value x(i, j) is displaced to the high level side from an inflection point of the coefficient calculation function G(L) (FIG. 7B), where the conventional level conversion function described hereinabove with reference to FIG. 19 is applied, the contrast is suppressed with regard to all pixel values x(i, j) (FIG. 7C).

Figure 7D:
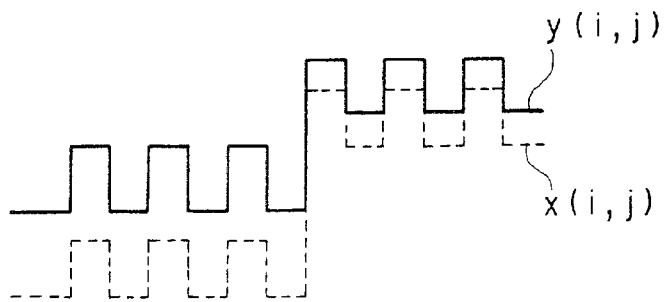

Also in this instance, however, on the higher level side and the lower level side, the pixel values are corrected with the gains g2 and g5 corresponding to the average levels L2 and L5, respectively, and although the gradation when the image is viewed entirely does not exhibit a great variation, when a pulsation is viewed microscopically, a great pulsation of the image pickup result VT of the input image can be expanded (FIG. 7D).

When a pixel value x(i, j) is corrected, in the television camera 1 of the present embodiment, the time smoothing circuit 12 reduces a time variation of the correction coefficient g(i, j) of each pixel. Consequently, with regard to a still picture, flickering of an edge which is caused by a time variation of the correction coefficient g(i, j) is prevented, and deterioration of the picture quality is prevented effectively. Also with regard to a moving picture, a sudden variation of a pixel value in the proximity of an edge at which motion is exhibited is reduced, and consequently, a natural image free from an unnatural feeling can be formed.

1-3. Effects of the First Embodiment

With the television camera 1 having the construction described above, since an area to which each image data belong is discriminated and a correction coefficient to be used for correction of the pixel value of the image data is produced based on a result of the discrimination and then the pixel value of the image data is corrected with the correction coefficient, while the relationship in magnitude among pixel values in the same area is maintained because the same coefficient is used, pixel values which belong to different areas can be made nearer to each other in accordance with the necessity, and in an extreme case, the relationship can be reversed. Consequently, the contrast in each area can be expanded within a predetermined level range, and the gradation of the entire image can be corrected while preventing a partial reduction of the contrast. In this instance, since such correction coefficients are smoothed between successive frames, also for a moving picture, a natural image free from an unnatural feeling can be formed.

Further, where a low frequency component obtained using low-pass filters is used as a characteristic amount of input image data and the pixel value is corrected with reference to the low frequency component, the gradation of the entire image can be corrected while preventing a partial reduction of the contrast with a simple construction.

Further, since the time smoothing circuit recursively processes input data with a time constant set in advance to smooth such correction coefficients, the picture quality can be varied in accordance with the setting of the time constant.

2. Second Embodiment

Figure 8:
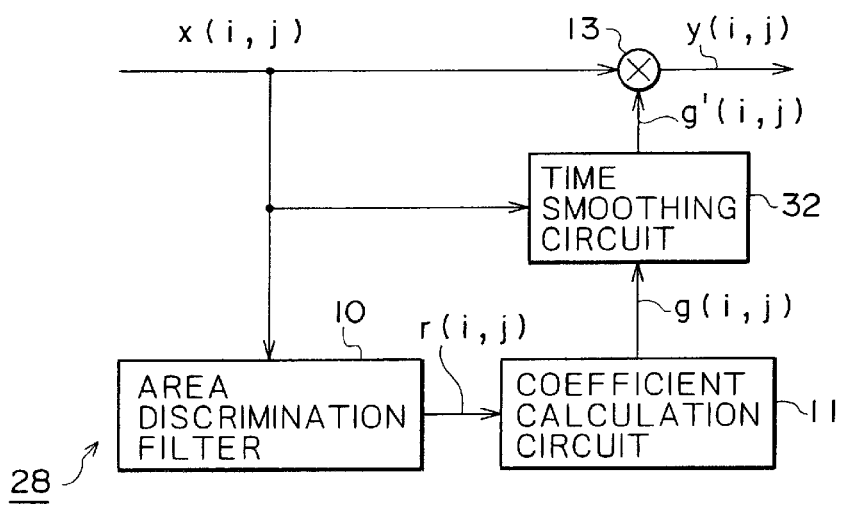
FIG. 8 is a block diagram showing a gradation correction circuit applied to a television camera according to a second preferred embodiment of the present invention.

FIG. 8 is a block diagram showing a gradation correction circuit applied to a television camera according to a second preferred embodiment of the present invention. The gradation correction circuit is generally denoted at 28 and is applied in place of the gradation correction circuit 8 described hereinabove with reference to FIG. 1. The gradation correction circuit 28 includes an area discrimination filter 10, a coefficient calculation circuit 11, a multiplication circuit 13, and a time smoothing circuit 32. The area discrimination filter 10, coefficient calculation circuit 11 and multiplication circuit 13 are similar to those of the gradation correction circuit 8, and overlapping description of them is omitted here to avoid redundancy.

Thus, the gradation correction circuit 28 of FIG. 8 is different from the gradation correction circuit 8 shown of FIG. 1 in that, in order to smooth correction coefficients g(i, j), it includes the time smoothing circuit 32 in place of the time smoothing circuit 12.

Figure 9:
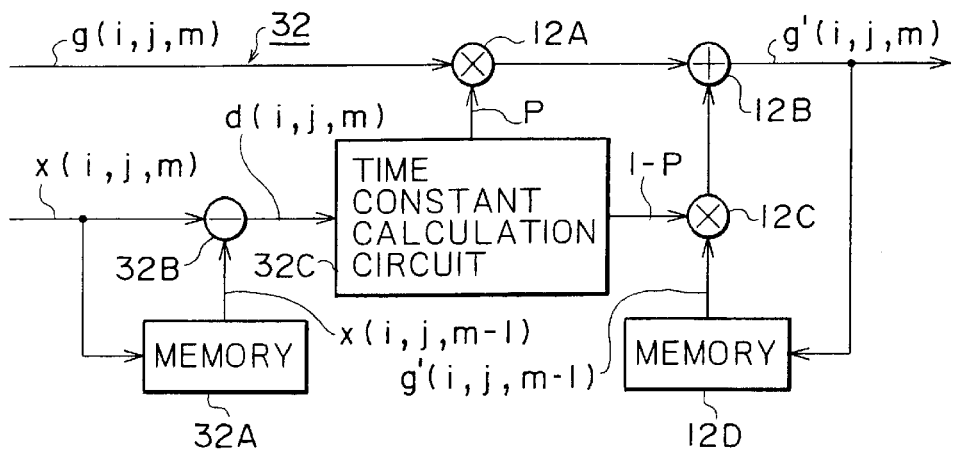
FIG. 9 is a block diagram showing a time smoothing circuit of the gradation correction circuit of FIG. 8.

Referring to FIG. 9, the time smoothing circuit 32 includes a multiplication circuit 12A, an addition circuit 12B, another multiplication circuit 12C, a memory 12D, another memory 32A, a subtraction circuit 32B, and a time constant calculation circuit 32C. The multiplication circuits 12A and 12C, addition circuit 12B and memory 12D are similar to those of the time smoothing circuit 12 described hereinabove with reference to FIG. 5, and overlapping description of them is omitted here to avoid redundancy. The time smoothing circuit 32 thus includes, in addition to the components of the time smoothing circuit 12, the memory 32A, subtraction circuit 32B and time constant calculation circuit 32C as means for setting a time constant P based on a pixel value x(i, j).

In the time smoothing circuit 32, a pixel value x(i, j, m) of a luminance signal Y which forms an image pickup result VT is successively received by and stored into the memory 32A, from which it is outputted after delayed by an interval of one frame. The subtraction circuit 32B successively subtracts the pixel value x(i, j, m−1) delayed by one frame by and outputted from the memory 32A from the corresponding pixel value x(i, j, m) of the following frame successively inputted to the time smoothing circuit 32, and outputs a resulting difference value d(i, j, m) to the time constant calculation circuit 32C.

The time constant calculation circuit 32C executes arithmetic processing of the following expression (8) based on the difference value d(i, j, m) to calculate a time constant P and outputs weighting values P and 1−P for the multiplication circuits 12A and 12C, respectively, based on the calculated time constant P.

$$P = \min\left(P\max, P\max \times \frac{\text{abs}(d(i, j, m))}{Tdif}\right) \quad (8)$$

where max(a, b) is a function of outputting a value of a greater one of a and b, abs is a function of conversion into an absolute value, Pmax is a maximum value which can be assumed by the time constant P, and Tdif is a constant for normalization. The maximum value Pmax and the constant Tdif are set in advance.

The time smoothing circuit 32 adaptively switches smoothing processing in response to a pixel value. In particular, the time smoothing circuit 32 switches its smoothing processing such that, when the pixel value x(i, j, m) exhibits a great variation, it uses a high value for the time constant P so that the correction coefficients may be smoothed appropriately between an image portion which exhibits a great amount of motion and another image portion which exhibits a comparatively small amount of motion.

Where the gradation correction circuit 28 is employed, since correction coefficients are smoothed appropriately between an image portion which exhibits a great amount of motion and another image portion which exhibits a comparatively small amount of motion, the gradation of the entire image is corrected while preventing partial deterioration of the contrast. Consequently, where the television camera of the present embodiment is applied to a moving picture, a further natural image free from an unfamiliar feeling can be formed.

3. Third Embodiment

Figure 10:
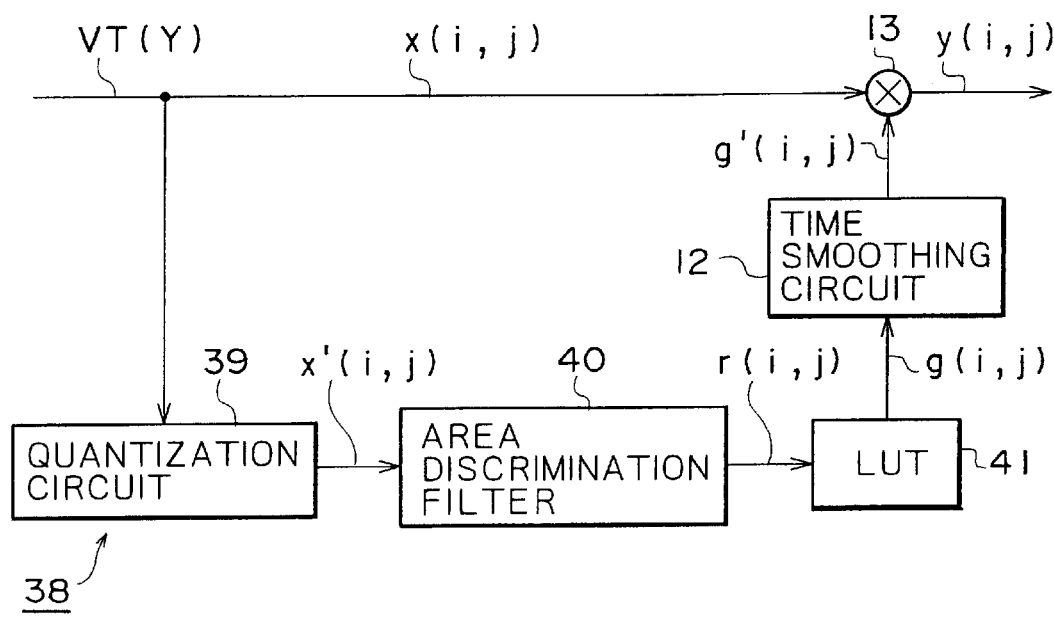
FIG. 10 is a block diagram showing a gradation correction circuit applied to a television camera according to a third preferred embodiment of the present invention.

FIG. 10 is a block diagram showing a gradation correction circuit applied to a television camera according to a third preferred embodiment of the present invention. The gradation correction circuit is generally denoted at 38 and is applied in place of the gradation correction circuit 8 described hereinabove with reference to FIG. 1. The gradation correction circuit 38 includes a quantization circuit 39, an area discrimination filter 40, a lookup table (LUT) 41, a time smoothing circuit 12, and a multiplication circuit 13. The time smoothing circuit 12 and multiplication circuit 13 are similar to those of the gradation correction circuit 8 of the television camera 1 described hereinabove with reference to FIG. 1, and overlapping description of them is omitted here to avoid redundancy.

The quantization circuit 39 quantizes a pixel value of a luminance signal Y which forms an image pickup result VT to reduce the number of bits of the luminance signal Y and outputs the luminance signal Y with the number of bits reduced. In particular, the quantization circuit 39 in the gradation correction circuit 38 executes, for each pixel value x(i, j), arithmetic processing of the following expression (9) with a quantization step Q set in advance to linearly quantize the pixel value x(i, j) to obtain a pixel value x'(i, j) and outputs the pixel value x'(i, j).

$$x' = (i, j) = \text{int}\left(\frac{x(i, j)}{Q} + 0.5\right) \quad (9)$$

where int(a) is a function of discarding the fraction of "a".

The area discrimination filter 40 is formed similarly to the area discrimination filter 10 described hereinabove with reference to FIG. 1 except that it handles a signal of a different number of bits.

The lookup table (LUT) 41 forms a coefficient calculation circuit and produces and outputs a correction coefficient g(i, j) using a low frequency component r(i, j) outputted from the area discrimination filter 40 as an address. To this end, the lookup table 41 stores a correction coefficient LUT(i) given by the following expression (10) as an i-th address.

$$LUT(i) = G(i \times Q) \quad \ldots (10)$$

Where the gradation correction circuit 38 is employed, a pixel value is quantized in advance and necessary processing is performed with the quantized pixel value. Consequently, similar advantages to those achieved by the television camera 1 described hereinabove with reference to FIG. 1 can be achieved. Further, since a correction coefficient is produced using a lookup table, the processing of the entire apparatus can be simplified as much. Furthermore, since a pixel value quantized in advance is used, the construction of the area discrimination filter can be simplified and the lookup table can be reduced in scale.

4. Fourth Embodiment

Figure 11:
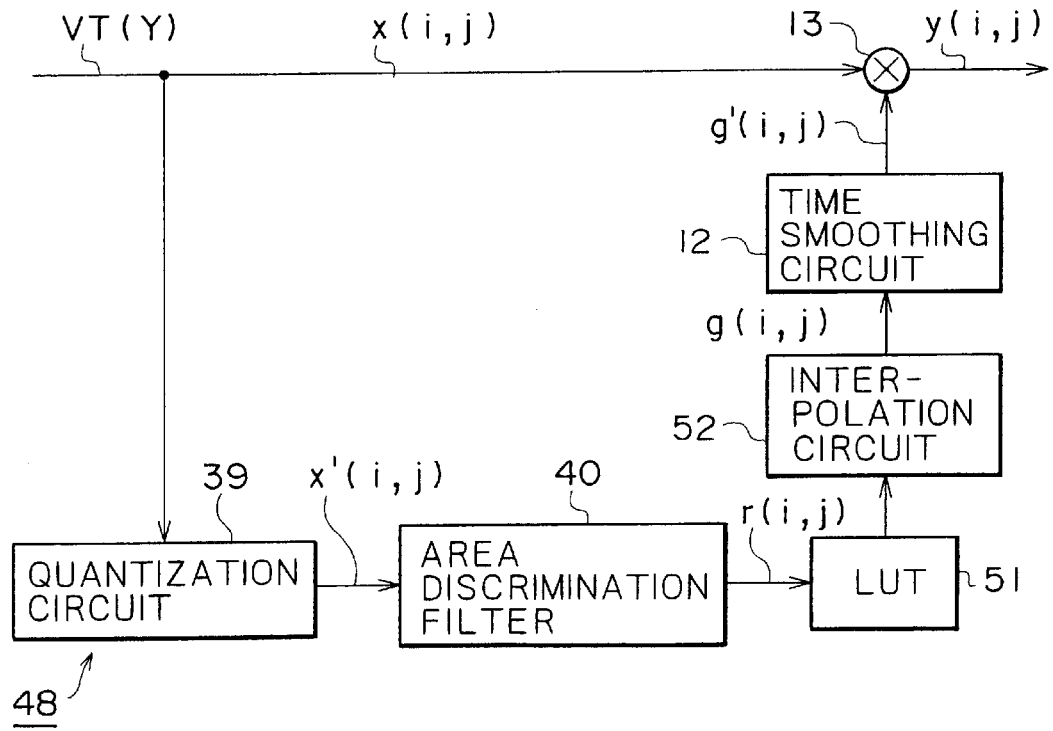
FIG. 11 is a block diagram showing a gradation correction circuit applied to a television camera according to a fourth preferred embodiment of the present invention.

FIG. 11 is a block diagram showing a gradation correction circuit applied to a television camera according to a fourth preferred embodiment of the present invention. The gradation correction circuit is generally denoted at 48 and is adapted in place of the gradation correction circuit 38 described hereinabove with reference to FIG. 10. The gradation correction circuit 48 includes a quantization circuit 39, an area discrimination filter 40, a lookup table (LUT) 51, an interpolation circuit 52, a time smoothing circuit 12, and a multiplication circuit 13. The quantization circuit 39, area discrimination filter 40, time smoothing circuit 12 and multiplication circuit 13 are similar to those of the gradation correction circuit 38 described hereinabove with reference to FIG. 10, and overlapping description of them is omitted here to avoid redundancy. The gradation correction circuit 48 thus includes the lookup table 51 and the interpolation circuit 52 in place of the lookup table 41 of the gradation correction circuit 38.

The lookup table 51 in the gradation correction circuit 48 has a number of addresses smaller than the number of levels which can be assumed by the output value $r(i, j)$ of the area discrimination filter 40, and is accessed with a value of the output value $r(i, j)$ whose predetermined lower bits are omitted. When the lookup table 51 is accessed in this manner, it outputs two addresses $addr0(i, j)$ and $addr1(i, j)$ represented by the following expressions (11) and two correction coefficients $g0(i, j)$ and $g1(i, j)$.

$$addr0(i, j) = \text{int}\left(\frac{r(i, j)}{R\max} \times R'\max\right) \quad (11)$$
$$addr1(i, j) = addr0(i, j) + 1$$

where Rmax is a maximum value which can be assumed by the output value $x(i, j)$ of the area discrimination filter 40, and R'max is a maximum value which can be assumed by the address of the lookup table 51.

It is to be noted that the lookup table 51 produces the address $addr0(i, j)$ by omitting lower bits of the output value $r(i, j)$ of the area discrimination filter 40 and produces the address $addr1(i, j)$ by adding a bit of the logic 1 to the lowest bit of the address $addr0(i, j)$.

The interpolation circuit, 52 executes interpolation arithmetic processing in accordance with the following expressions (12) using the addresses $addr0(i, j)$ and $addr1(i, j)$ and the correction coefficients $g0(i, j)$ and $g1(i, j)$ inputted thereto from the lookup table 51 and outputs a result of the interpolation as a correction coefficient $g(i, j)$.

$$g(i, j) = \frac{r'(i, j) - addr0(i, j)}{addr1(i, j) - addr0(i, j)} \times \quad (12)$$
$$(g1(i, j) - g0(i, j)) + g0(i, j)$$
$$r'(i, j) = \frac{r(i, j)}{R\max} \times R'\max$$

Where the gradation correction circuit 48 shown in FIG. 11 is employed, since interpolation arithmetic processing is performed to produce a correction coefficient, a correction coefficient whose value exhibits a smooth variation can be produced using a lookup table of a comparatively small scale, and the gradation can be corrected with a higher degree of accuracy as much.

5. Fifth Embodiment

Figure 12:
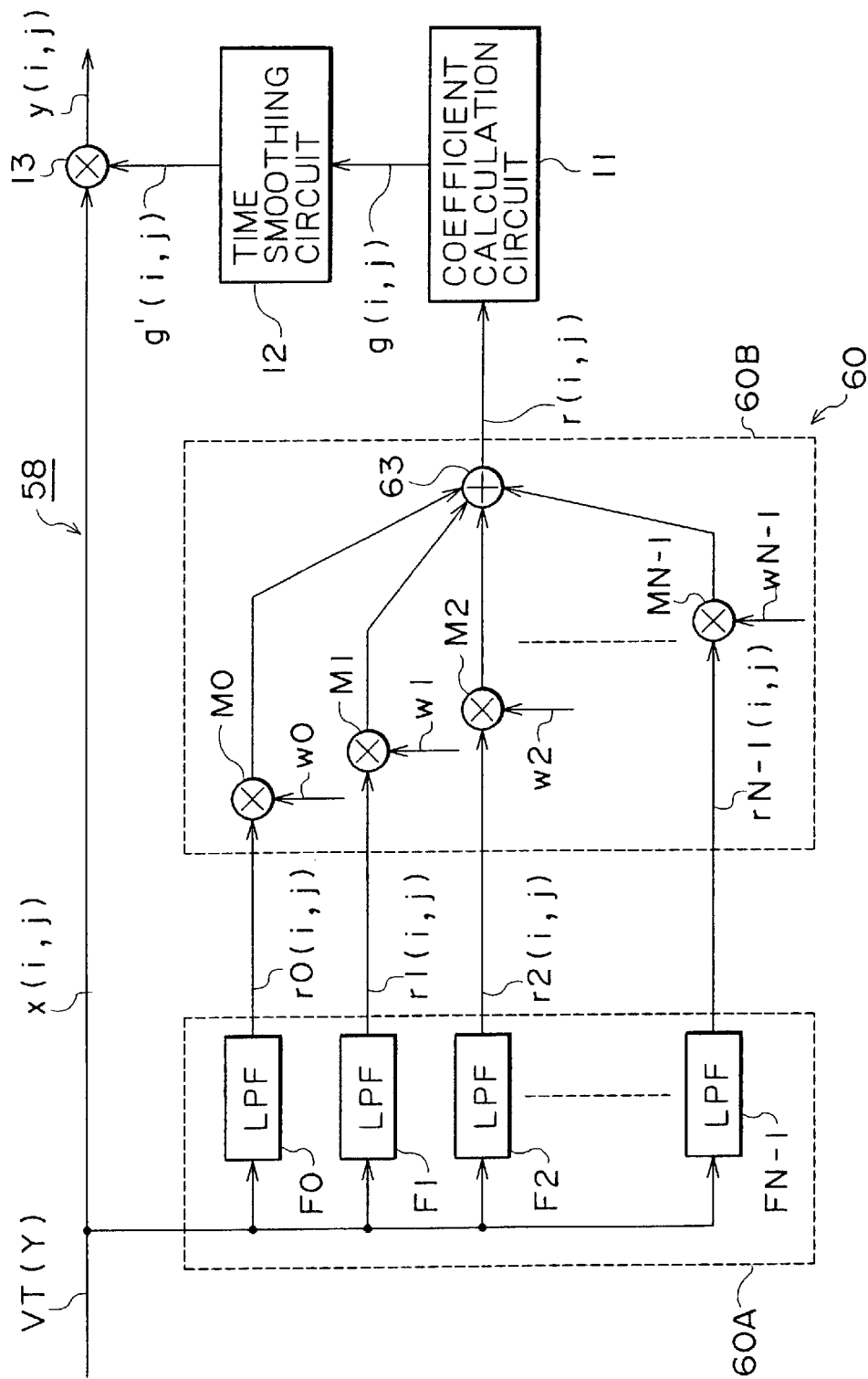
FIG. 12 is a block diagram showing a gradation correction circuit applied to a television camera according to a fifth preferred embodiment of the present invention.

FIG. 12 is a block diagram showing a gradation correction circuit applied to a television camera according to a fifth embodiment of the present invention. The gradation correction circuit is generally denoted at gradation correction circuit 58 and is adapted in place of the gradation correction circuit 8 described hereinabove with reference to FIG. 1. The gradation correction circuit 58 includes an area discrimination filter 60, a coefficient calculation circuit 11, a time smoothing circuit 12, and a multiplication circuit 13. The coefficient calculation circuit 11, time smoothing circuit 12 and multiplication circuit 13 are similar to those of the gradation correction circuit 8 described hereinabove with reference to FIG. 1, and overlapping description of them is omitted here to avoid redundancy.

The area discrimination filter 60 in the gradation correction circuit 58 includes a low-pass filter section 60A which discriminates an area to which image data belong with different resolutions and outputs discrimination results $r0(i, 1), r1(i, j), r2(i, j), \ldots rN-1(i, j)$, and a signal composition section 60B for producing an identification result $r(i, j)$ of a single composite signal based on the discrimination results $r0(i, 1), r1(i, j), r2(i, j), \ldots rN-1(i, j)$ according to the different resolutions.

The low-pass filter section 60A is formed from low-pass filters (LPF) F0, F1, F2, . . . , FN--1 having different pass-band widths. A pixel value $x(i, j)$ of a luminance signal Y produced from an image pickup result VT is inputted to the low-pass filters F0, F1, F2, . . . , FN-1, and corresponding low frequency components are outputted as identification results $r0(i, j), r1(i, j), r2(i, j), \ldots, rN-1(i, j)$ from the low-pass filters F0, F1, F2, . . . , FN-1, respectively.

The signal composition section 60B includes multiplication circuits M0, M1, M2, . . . , MN-1 which receive and weight the identification results $r0(i, j), r1(i, j), r2(i, j), \ldots, rN-1(i, j)$, and an addition circuit 63 which adds the weighted identification results $r0(i, j), r1(i, j), r2(i, j), \ldots, rN-1(i, j)$ to produce a composite signal as an identification result $r(i, j)$. The identification result $r(i, j)$ thus obtained by the addition circuit 63 is outputted from the signal composition section 60B. It is to be noted that weighting coefficients w0, w1, w2, . . . , wN-1 which are used by the multiplication circuits M0, M1, M2, . . . , MN-1, respectively, are set in advance so that they may satisfy the following relational expression (13):

$$\sum_{k=0}^{N-1} wk = 1 \quad (13)$$

Consequently, in the gradation correction circuit 48 described above, a profile provided by the image pickup result VT is not emphasized abnormally according to the setting of the weighting coefficients w0, w1, w2, ..., wN−1.

Figure 13A:
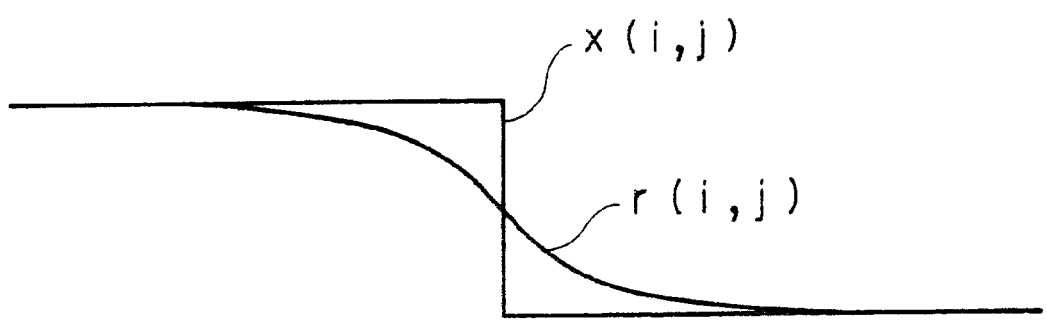
FIGS. 13A and 13B are signal waveform diagrams illustrating operation of the gradation correction circuit of FIG. 12.
Figure 13B:
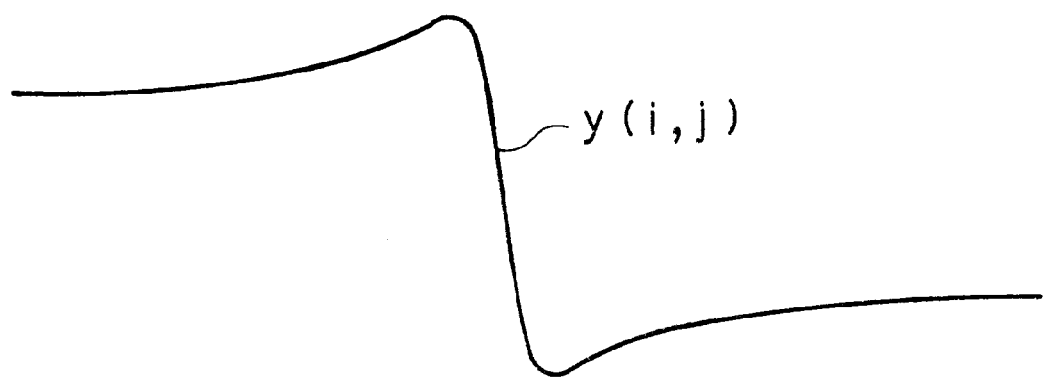

In particular, if the pixel value x(i, j) varies suddenly as seen in FIG. 13A, then the signal level of the low frequency component r(i, j) varies so that such a sudden variation of the pixel value may be moderated. When the signal level of the low frequency component r(i, j) of the pixel value x(i, j) is displaced to the higher level side with respect to the inflection point of the characteristic described hereinabove with reference to FIG. 4, if the contrast correction coefficient g(i, j) is produced merely based on an output signal of a low-pass filter as in the television camera 1 of FIG. 1, then the pixel value is amplified with an excessively high gain immediately before the pixel value x(i, j) varies suddenly, but immediately after the pixel value x(i, j) varies suddenly, the pixel value is amplified with an excessively low gain. Consequently, an output value y(i, j) (FIG. 13B) which provides an abnormally amplified profile is obtained.

In this instance, such abnormal emphasis of the profile as just described can be reduced by correcting the pixel values with a substantially uniform gain.

Consequently, where the gradation correction circuit 58 shown in FIG. 12 is employed, since correction coefficients are produced from a plurality of different low frequency components, abnormal emphasis of a profile can be prevented effectively, and similar advantages to those achieved by the television camera 1 of the first embodiment described hereinabove with reference to FIG. 1 can be achieved.

6. Sixth Embodiment

Figure 14:
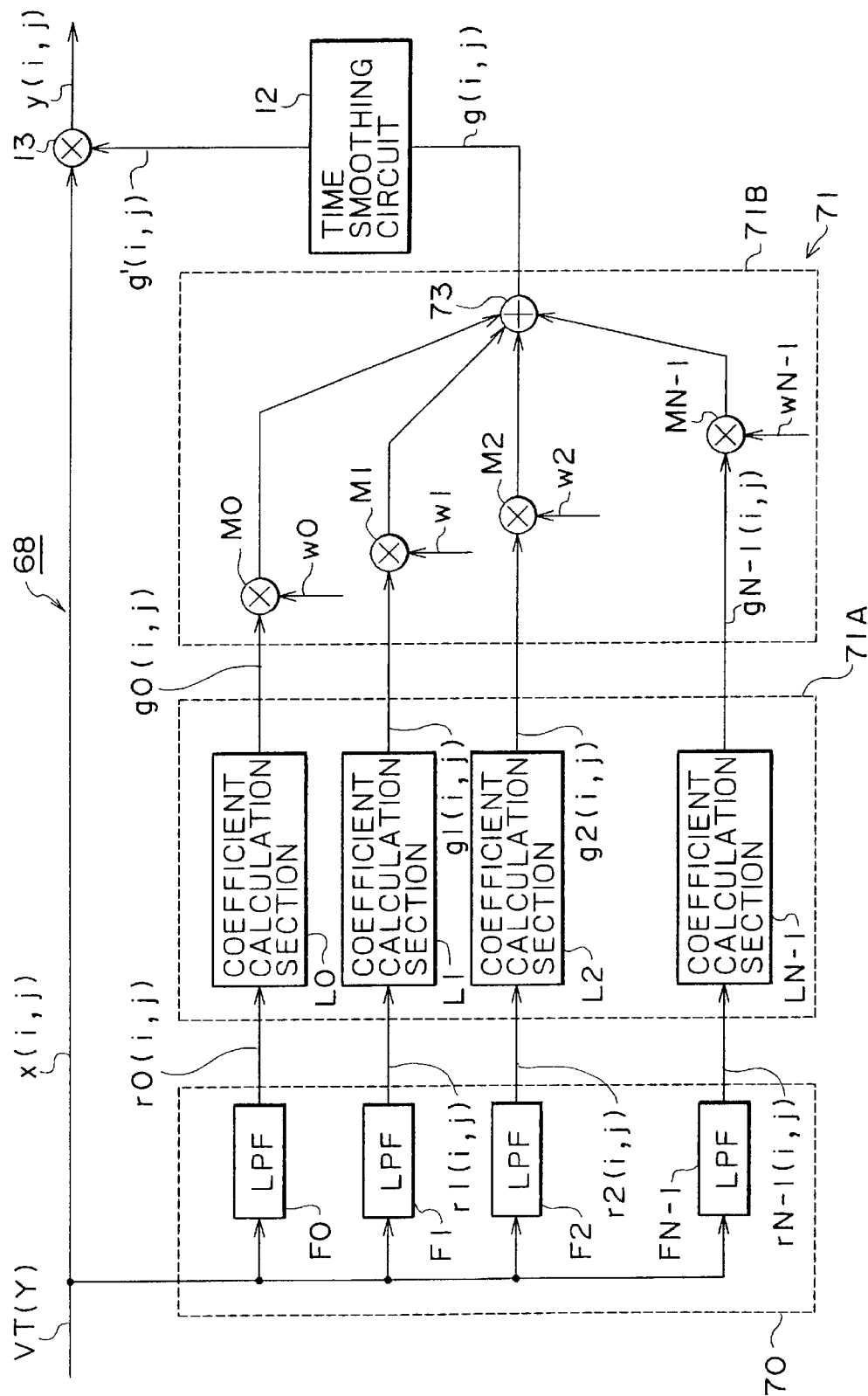
FIG. 14 is a block diagram showing a gradation correction circuit applied to a television camera according to a sixth preferred embodiment of the present invention.

FIG. 14 is a block diagram showing a gradation correction circuit applied to a television camera according to a sixth preferred embodiment of the present invention. The gradation correction circuit is generally denoted at 68 and is adapted in place of the gradation correction circuit 8 described hereinabove with reference to FIG. 1. The gradation correction circuit 68 includes an area discrimination filter 70, a coefficient calculation circuit 71, a time smoothing circuit 12, and a multiplication circuit 13. The time smoothing circuit 12 and multiplication circuit 13 are similar to those of the gradation correction circuit 8 described hereinabove with reference to FIG. 1, and overlapping description of it is omitted here to avoid redundancy.

The area discrimination filter 70 in the gradation correction circuit 68 discriminates an area to which image data belong with different resolutions and outputs discrimination results r0(i, j), r1(i, j), r2(i, j), ... rN−1(i, j). In particular, the area discrimination filter 70 is formed from low-pass filters (LPF) F0, F1, F2, FN−1 having different pass-band widths. A pixel value x(i, j) is inputted to the low-pass filters (LPF) F0, F1, F2, ..., FN−1, and corresponding low frequency components are outputted as identification results r0(i, j), r1(i, j), r2(i, j), ..., rN−1(i, j) from the low-pass filters F0, F1, F2, ..., FN−1, respectively.

The coefficient calculation circuit 71 includes a coefficient production section 71A for producing, from the identification results r0(i, j), r1(i, j), r2(i, rN−1(i, j), corresponding correction coefficients g0(i, j), g1(i, j), g2(i, j), ..., gN−1(i, j), and a coefficient composition section 71B for composing the correction coefficients g0(i, j), g1(i, j), g2(i, j), ..., gN−1(i, j) to produce a single correction coefficient g(i, j).

The coefficient production section 71A includes coefficient calculation sections L0, L1, L2, ..., LN−1 for producing, from the identification results r0(i, j), r1(i, j), r2(i, j), ..., rN−1(i, j), corresponding correction coefficients g0(i, j), g1(i, j), g2(i, j), gN−1(i, j) based on predetermined coefficient calculation functions Gk (k=0, 1, 2, ..., N−1), respectively.

The coefficient composition section 71B includes multiplication circuits M0, M1, M2, ..., MN−1 which weight the correction coefficients g0(i, j), g1(i, j), g2(i, j), ..., gN−1(i, j), and an addition circuit 63 which adds results of the weighting by the multiplication circuits M0, M1, M2, ..., MN−1 to produce and output a single correction coefficient g(i, j). It is to be noted that weighting coefficients w0, w1, w2, ..., wN−1 used by the multiplication circuits M0, M1, M2, ..., MN−1, respectively, are set in advance so that the relational expression (13) given hereinabove may be satisfied.

Where the gradation correction circuit 68 shown in FIG. 14 is employed, correction coefficients are produced from a plurality of different low frequency components and a single correction coefficient is produced from the produced correction coefficients, and consequently, similar advantages to those achieved by the gradation correction circuit 58 described hereinabove with reference to FIG. 12 can be achieved.

7. Seventh Embodiment

Figure 15:
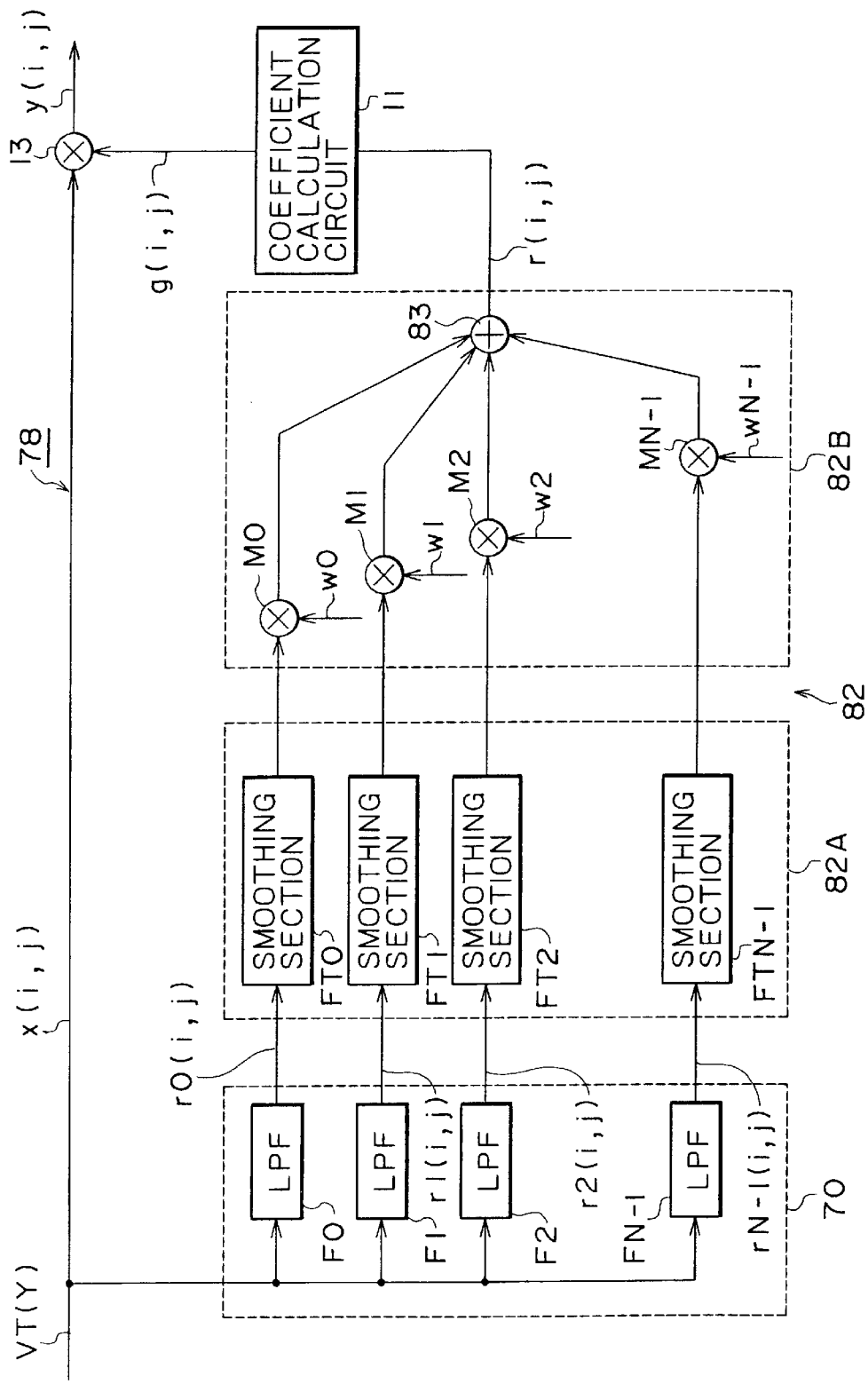
FIG. 15 is a block diagram showing a gradation correction circuit applied to a television camera according to a seventh preferred embodiment of the present invention.

FIG. 15 is a block diagram showing a gradation correction circuit applied to a television camera according to a seventh preferred embodiment of the present invention. The gradation correction circuit is generally denoted at 78 and is adapted in place of the gradation correction circuit 8 described hereinabove with reference to FIG. 1. The gradation correction circuit 78 includes an area discrimination filter 70, a time smoothing circuit 82, a coefficient calculation circuit 11, and a multiplication circuit 13. The coefficient calculation circuit 11 and multiplication circuit 13 are similar to those of the gradation correction circuit 8 described hereinabove with reference to FIG. 1 while the area discrimination filter 70 is similar to that of the gradation correction circuit 68 described hereinabove with reference to FIG. 14, and overlapping description of it is omitted here to avoid redundancy.

In the gradation correction circuit 78, the time smoothing circuit 82 is interposed between the area discrimination filter 70 and the coefficient calculation circuit 11. The time smoothing circuit 82 includes a time smoothing section 82A for time smoothing discrimination results r0(i, j), r1(i, j), r2(i, j), ..., rN−1(i, j) inputted thereto from the low-pass filters (LPF) F0, F1, F2, ..., FN−1 of the area discrimination filter 70, and a composition section 82B for composing the discrimination results smoothed by the time smoothing section 82A to produce a single discrimination result r(i, j).

The time smoothing section 82A includes smoothing sections FT0, FT1, FT2, ..., FTN−1 which have a similar construction to that of the time smoothing circuit 12 described hereinabove with reference to FIG. 5. The smoothing sections FT0, FT1, FT2, ..., FTN−1 smooth the corresponding discrimination results r0(i, j), r1(i, j), r2(i, j), ..., rN−1(i, j), respectively.

The composition section 82B includes multiplication circuits M0, M1, M2, ..., MN−1 which weight the discrimination results r0(i, j), r1(i, j), r2(i, j), rN−1(i, j) time smoothed by the smoothing sections FT0, FT1, FT2, . . . , FTN−1, and an addition circuit 83 which adds results of the weighting by the multiplication circuits M0, M1, M2, . . . , MN−1 to produce and output a single discrimination result r(i, j). It is to be noted that weighting coefficients w0, w1, w2, . . . , wN−1 used by the multiplication circuits M0, M1, M2, . . . , MN−1, respectively, are set in advance so that the relational expression (13) given hereinabove may be satisfied.

Where the gradation correction circuit 78 shown in FIG. 15 is employed, correction coefficients are smoothed by smoothing of discrimination results, and consequently, similar advantages to those achieved by the gradation correction circuit 58 described hereinabove with reference to FIG. 12 can be achieved.

8. Other Forms

Figures 16, 17:
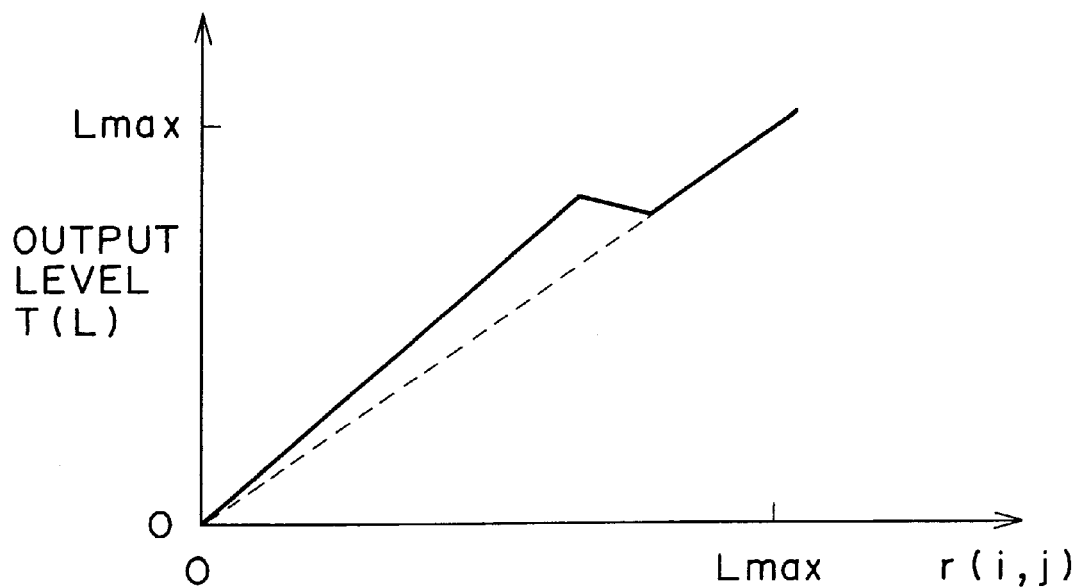
FIG. 16 is a characteristic diagram illustrating a level conversion function applied to a gradation correction circuit applied to a television camera according to a different embodiment of the present invention.
FIG. 17 is a plan view showing a color filter.

It is to be noted that, while, in all of the embodiments described above, a correction coefficient is produced basically with a characteristic described hereinabove with reference to FIG. 4, the present invention is not limited to this, and a correction coefficient may be produced with any of various input/output characteristics. For example, a level conversion function may be used which provides such an input/output characteristic wherein the output level decreases intermediately as the input level increases as seen in FIG. 16.

In particular, according to a conventional technique, where such a function as described above is used, since it is not a monotone increasing function, a false profile sometimes appears on an image of a result of processing. However, where image data are divided into different areas by means of low-pass filters and processing is performed for the image data of the different areas as in the embodiments described hereinabove, such a large variation of a pixel value that causes reversal of a relationship in magnitude between pixel values can be prevented within each neighboring area of a magnitude corresponding to the pass band of the corresponding filter. Consequently, appearance of a false profile can be prevented effectively.

Further, while, in the embodiments described above, a coefficient calculation function G is produced by arithmetic processing of the expression (5) using the level conversion function T, the present invention is not limited to this, and the coefficient calculation function G may be set arbitrarily without using the level conversion function T.

Furthermore, while, in the embodiments described above, a gradation is corrected by a gradation correction circuit and then the dynamic range is suppressed by a succeeding signal processing circuit, the present invention is not limited to this, and such processes may be executed collectively in accordance with the setting of the level conversion function T and the corresponding coefficient calculation function G.

In particular, in the process of suppressing the dynamic range, it is required that the number of bits of a pixel value to be outputted be smaller than the number of bits of a pixel value inputted, and the processes described above can be executed collectively by setting the maximum value of the output level to a maximum value permitted to an output image in the level conversion function T and producing a coefficient calculation function G using the maximum value thus set.

Where the coefficient calculation function G is set arbitrarily without using the level conversion function T, the coefficient calculation function G should be set so as to satisfy the following expressions (14):

$$L \times G(L) \leq L0max 0 \leq L \leq Lmax \qquad \ldots (14)$$

where L is the input pixel level, Lmax is the maximum value of the input pixel level, and L0max is the maximum value of the output pixel level.

Further, while it is described in the description of the second embodiment that the time constant P is varied in response to the difference value between corresponding pixel values, the present invention is not limited to this, and, for example, the time constant P may be varied in a unit of one screen in response to an accumulated value obtained by accumulating such difference values for one screen.

Further, while it is described in the description of the second embodiment that the time constant P of the time smoothing circuit is varied in response to an input image, the present invention is not limited to this, and such variation of the time constant P may be applied to the gradation correction circuits of the third to seventh embodiments described above.

Further, while, in the third and the fourth embodiments described above, a quantization circuit, a lookup table and an interpolation circuit are used, the present invention is not limited to this, and all or some of a quantization circuit, a lookup table and an interpolation circuit may be applied if necessary to the apparatus other than the third and fourth embodiments.

Or conversely, a quantization circuit may be omitted if necessary from the third and fourth embodiments.

Figure 18:
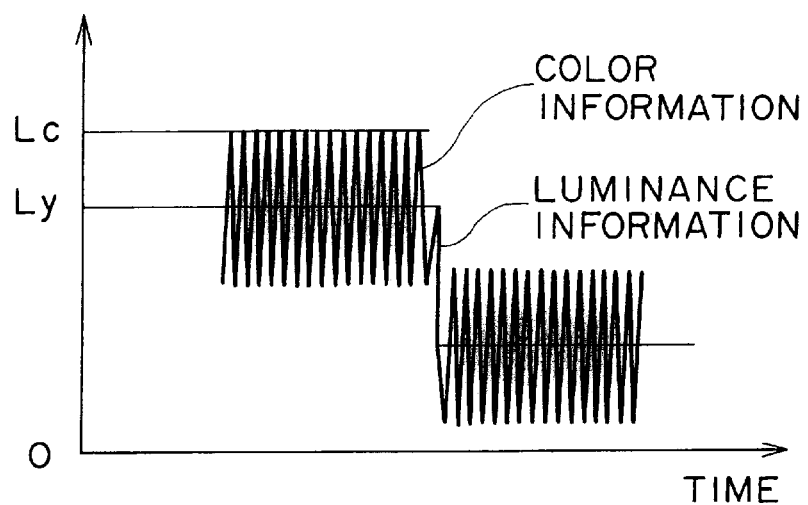
FIG. 18 is a signal waveform diagram illustrating a result of image pickup when the color filter of FIG. 17 is used.

Furthermore, while, in the embodiments described above, a luminance signal is produced from a color signal and the gradation of the color signal is corrected with reference to the luminance signal, the present invention is not limited to this and can be applied widely to a case (FIG. 18) wherein an image pickup result wherein an amplitude modulated color signal is superposed on a luminance signal outputted from a solid-state image pickup device of the single plate type is processed based on, for example, such setting of a color filter as shown in FIG. 17, another case wherein a video signal composed of a luminance signal and a color difference signal is processed, a further case wherein a composite video signal wherein a chroma signal is superposed on a luminance signal is processed, and so forth.

It is to be noted that, for example, where an image pickup result wherein an amplitude modulated color signal is superposed on a luminance signal is processed, the gradation can be corrected while preventing color noise effectively by setting the resolution of the correction coefficient lower than the modulation frequency of the color signal.

Where a video signal composed of a luminance signal and a color difference signal is processed, the gradation of the video signal can be corrected by calculating a correction coefficient based on the luminance signal and correcting the gradations of the luminance signal and the color difference signal with the correction coefficient.

Further, while, in the embodiments described above, an area to which each input image data belongs is discriminated with low-pass filters and low frequency components outputted from the low-pass filters are used as a discrimination result, the present invention is not limited to this and can be applied to discrimination of an area to which image data belong using various characteristic amounts or using various processing methods for a processing object image such as, for example, a case wherein the similarity between a pixel selected arbitrarily from an image of a processing object and neighboring pixels around the pixel is grasped as a characteristic amount and the area is successively expanded from the pixel to divide the processing object image into several areas and besides the characteristic amount is outputted as a discrimination result.

Furthermore, while, in the embodiments described above, the present invention is applied to a television camera, the present invention is not limited to this and can be applied widely to various image processing apparatus such as a television receiver, a video tape recorder and a printer.

As described above, according to the present invention, since an area to which each image data belongs is discriminated, for example, with reference to a low frequency component of a pixel value to produce a correction coefficient and such correction coefficients are smoothed between frames to correct the pixel values of the image data, even where a moving picture is involved, the gradation can be corrected while preventing partial deterioration of the contrast effectively.

While preferred embodiments of the present invention have been described using specific terms, such description is for illustrative purposes only, and it is to be understood that changes and variations may be made without departing from the spirit or scope of the following claims.

What is claimed is:

1. An image processing apparatus capable of correcting the gradation of image data, comprising:
   area discrimination means for discriminating areas to which the image data belong and outputting discrimination results;
   coefficient calculation means for outputting correction coefficients to be used for correction of pixel values of the image data based on the discrimination results;
   smoothing means for smoothing corresponding ones of the correction coefficients between corresponding ones of the image data of successive frames, said smoothing means including a filter for recursively processing input data with a predetermined time constant and switches the time constant in response to the image data; and
   correction means for correcting the pixel values of the image data with the correction coefficients.

2. An image processing apparatus according to claim 1, wherein said area discrimination means detects a characteristic amount indicative of a characteristic of a predetermined range neighboring to each of the image data and outputting the characteristic amount as the discrimination result, and said coefficient calculation means outputs the correction coefficients based on the characteristic amounts received from said area discrimination means.

3. An image processing apparatus according to claim 1, wherein said area discrimination means includes a low-pass filter for extracting a low frequency component of each of the image,e data, and said coefficient calculation means produces the correction coefficients in response to the low frequency components received from said low-pass filter.

4. An image processing apparatus according to claim 1, wherein said area discrimination means includes quantization means for quantizing the image data, and a low-pass filter for extracting a low frequency component from each of the image data quantized by said quantization means, and said coefficient calculation means produces the correction coefficients in response to the low frequency components received from said low-pass filter.

5. An image processing apparatus according to claim 1, wherein said area discrimination means includes a plurality of low-pass filters for individually extracting low frequency components of each of the image data, and signal composition means for producing single composite signals based on the low frequency components outputted from said low-pass filters, and said coefficient calculation means produces the correction coefficients based on the composite signals received from said signal composition means.

6. An image processing apparatus according to claim 5, wherein said signal composition means weighted averages the low frequency components outputted from said low-pass filters to produce the composite signals.

7. An image processing apparatus according to claim 5, wherein said signal composition me;ms weighted adds the low frequency components outputted from said low-pass filters with weighting coefficients set in advance to produce the composite signals.

8. An image processing apparatus according to claim 1, wherein said area discrimination means includes a plurality of low-pass filters for individually extracting low frequency components of each of the image data, and said coefficient calculation means includes partial coefficient calculation means for producing coefficients for correction from the low frequency components outputted from said low-pass filters, and coefficient composition means for producing the correction coefficients based on the coefficients for correction.

9. An image processing apparatus according to claim 8, wherein said coefficient composition means weighted adds the coefficients for correction to produce the correction coefficients.

10. An image processing apparatus according to claim 8, wherein said coefficient composition means weighted adds the coefficients for correction with weighting coefficients set in advance to produce the correction coefficients.

11. An image processing apparatus according to claim 1, wherein said correction means multiplies the pixel values of the image data by the correction coefficients to correct the pixel values of the image data.

12. An image processing apparatus according to claim 1, wherein said smoothing means smoothes the processing results from said area discrimination means.

13. An image processing apparatus according to claim 1, wherein said smoothing means includes a filter for recursively processing input data with a time constant set in advance.

14. An image processing apparatus according to claim 1, wherein said smoothing means switches the time constant based on a difference value between input pixel values thereto.

15. An image processing apparatus according to claim 1, wherein the number of bits of the image data outputted from said correction means is smaller than the number of bits of the image data inputted to said image processing apparatus.

16. An image processing apparatus according to claim 1, wherein the image data are data obtained by sampling a signal, wherein an amplitude modulated color signal is sequentially superposed on a luminance signal, with a predetermined frequency.

17. An image processing apparatus according to claim 1, wherein the image data are data obtained by sampling a color signal with a predetermined frequency.

18. An image processing apparatus according to claim 1, wherein the image data are data obtained by sampling a luminance signal and a color difference signal with a predetermined frequency.

19. An image processing method for correcting the gradation of image data, comprising:
   an area discrimination step of discriminating areas to which the image data belong and outputting discrimination results;
   a coefficient calculation step of outputting correction coefficients to be used for correction of pixel values of the image data based on the discrimination results;
   a smoothing step of smoothing corresponding ones of the correction coefficients between corresponding ones of the image data of successive frames, said smoothing including recursively filtering input data with a predetermined time constant to smooth the correction coefficients and switching the time constant in response to the image data; and a correction step of correcting the pixel values of the image data with the correction coefficients.

20. An image processing method according to claim 19, wherein the area discrimination step detects a characteristic amount indicative of a characteristic of a predetermined range neighboring to each of the image data and outputting the characteristic amount as the discrimination result, and the coefficient calculation step outputs the correction coefficients based on the characteristic amounts.

21. An image processing method according to claim 19, wherein the area discrimination step extracts a low frequency component of each of the image data, and the coefficient calculation step produces the correction coefficients in response to the low frequency components.

22. An image processing method according to claim 19, wherein the area discrimination step includes a quantization step of quantizing the image data, and a step of extracting a low frequency component from each of the image data quantized by the quantization step, and the coefficient calculation step produces the correction coefficients in response to the low frequency components.

23. An image processing method according to claim 19, wherein the area discrimination step includes an extraction step of extracting low frequency components of each of the image data with different frequency bands, and a signal composition step of producing single composite signals based on the low frequency components, and the coefficient calculation step produces the correction coefficients based on the composite signals.

24. An image processing method according to claim 23, wherein the signal composition step weighted averages the low frequency components to produce the composite signals.

25. An image processing method according to claim 23, wherein the signal composition step weighted adds the low frequency components with weighting coefficients set in advance to produce the composite signals.

26. An image processing method according to claim 19, wherein the area discrimination step extracts a plurality of low frequency components of each of the image data with different frequency bands, and the coefficient calculation step includes a partial coefficient calculation step of producing coefficients for correction from the low frequency components, and a coefficient composition step of producing the correction coefficients based on the coefficients for correction.

27. An image processing method according to claim 26, wherein the coefficient composition step weighted adds the coefficients for correction to produce the correction coefficients.

28. An image processing method according to claim 26, wherein the coefficient composition step weighted adds the coefficients for correction with weighting coefficients set in advance to produce the correction coefficients.

29. An image processing method according to claim 19, wherein the correction step multiplies the pixel values of the image data by the correction coefficients to correct the pixel values of the image data.

30. An image processing method according to claim 19, wherein the smoothing step smoothes the processing results of the area discrimination step.

31. An image processing method according to claim 19, wherein the smoothing step recursively filters input data with a time constant set in advance to smooth the correction coefficients.

32. An image processing method according to claim 19, wherein the smoothing step switches the time constant based on a difference value between input pixel values thereto.

33. An image processing method according to claim 19, wherein the number of bits of the images data outputted from the correction step is smaller than the number of bits of the image data inputted.

34. An image processing method according to claim 19, wherein the image data are data obtained by sampling a signal, wherein an amplitude modulated color signal is sequentially superposed on a luminance signal, with a predetermined frequency.

35. An image processing method according to claim 19, wherein the image data are data obtained by sampling a color signal with a predetermined frequency.

36. An image processing method according to claim 19, wherein the image data are data obtained by sampling a luminance signal and a color difference signal with a predetermined frequency.

* * * * *